United States Patent Office.

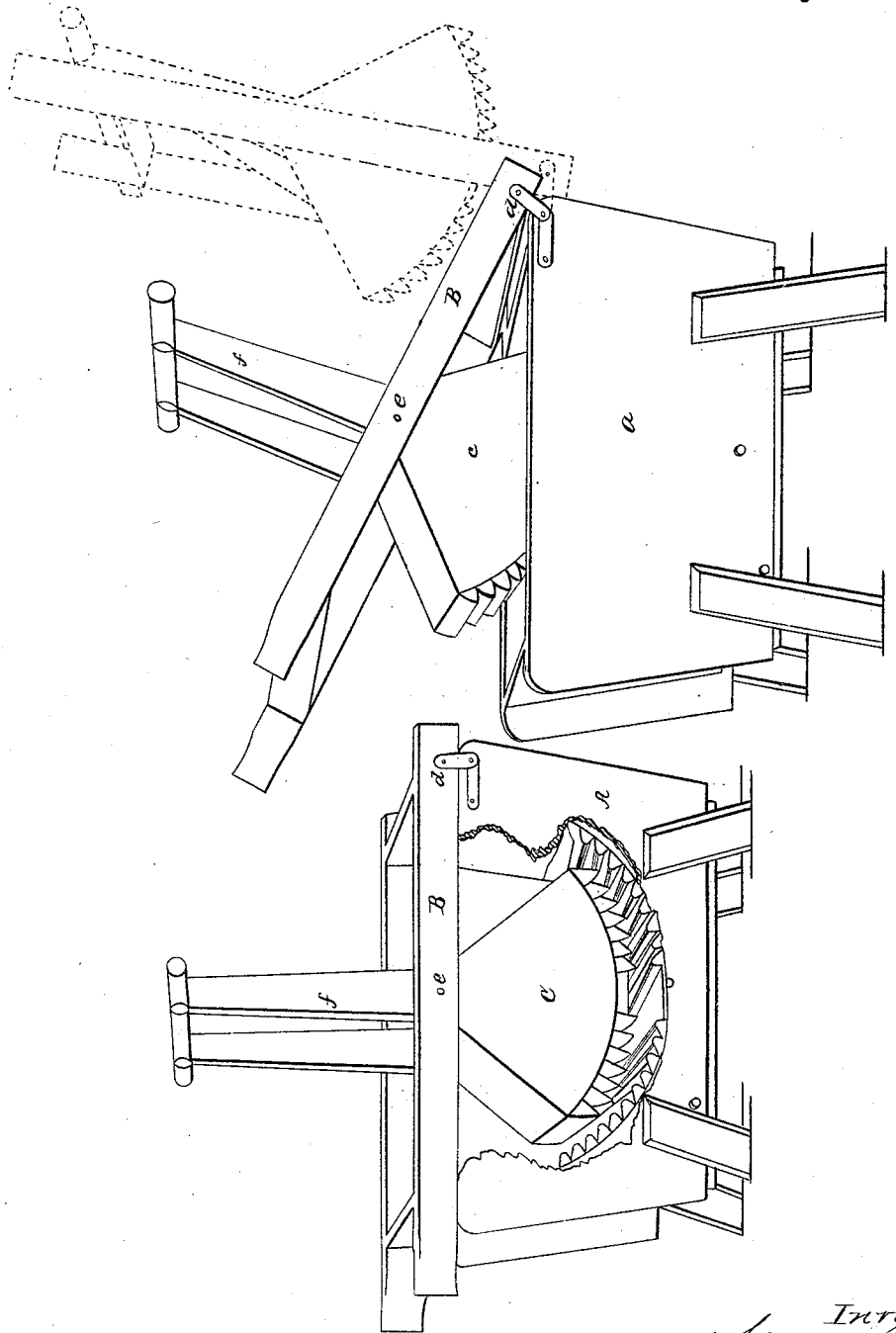

THOMAS BROWN, OF ROSEBURG, OREGON.

Letters Patent No. 68,599, dated September 10, 1867.

---

IMPROVED WASHING MACHINE.

---

The Schedule referred to in these Letters Patent and making part of the same.

---

TO ALL WHOM IT MAY CONCERN:

Be it known that I, THOMAS BROWN, of Roseburg, in the county of Douglas, and State of Oregon, have invented certain new and useful improvements on a Washing Machine; and I do hereby declare that the following is a full, clear, and exact description of the construction and operation of the same, reference being had to the annexed drawings, making a part of this specification, in which—

Figure 1 is a transverse section, and

Figure 2 is a perspective view.

In fig. 1, $a$ is the tub or vat, concave at the bottom, and set with three-cornered fixed rubbers, those on each side being inclined toward the centre. B is a frame fitting the top of the vat, and turning on hinges at $d$. $c$ is the dasher, working on gudgeons at $e$, and terminating above in the levers and handle $f$. The dasher is also set at the bottom with three-cornered fixed rubbers inclined toward the centre. Fig. 2 shows the position and working of the rubbers.

The machine is constructed throughout of pine or other lumber, from one to one and one-half inch in thickness. It is worked by raising the frame B, filling the vat about one-third full of water, putting in the clothes, putting down the frame, and working the dasher by the handle and levers $f$.

I disclaim the discovery of the principle of washing clothes by machinery, and also the invention of three-cornered fixed rubbers.

What I claim as new, and desire to secure by Letters Patent, is—

The combination of the frame B, jointed at $d$, with the beater C and ribs inclined towards the centre, and the rubbers at the bottom of the tub, also similarly inclined, all arranged and operating substantially as and for the purposes herein desired.

THOMAS BROWN.

Witnesses:
JAMES F. WATSON,
C. GADDIS.